Feb. 7, 1967　　　　　M. W. ROSE　　　　　3,303,418
ELECTRICAL APPARATUS FOR TESTING JOINTS
HAVING FOUR VOLTAGE PROBES
Filed May 27, 1963　　　　　　　　　　　3 Sheets-Sheet 1

WITNESSES
Leon J. Faza
James F. Young

INVENTOR
Merrill W. Rose
BY
Donald R. Lackey
ATTORNEY

United States Patent Office 3,303,418
Patented Feb. 7, 1967

3,303,418
ELECTRICAL APPARATUS FOR TESTING JOINTS HAVING FOUR VOLTAGE PROBES
Merrill W. Rose, Masury, Ohio, assignor to Westinghouse Electric Corporation, East Pittsburgh, Pa., a corporation of Pennsylvania
Filed May 27, 1963, Ser. No. 283,199
2 Claims. (Cl. 324—64)

This invention relates in general to testing apparatus and more particularly to electrical testing apparatus for determining the mechanical and electrical conditions of a joint produced when two conductors of electricity are joined.

Joining conductors of electricity by brazing, soldering, welding, clamping, crimping, bolting or any other joining means, to provide a joint which has substantially the same electrical resistance as a like length of the electrical conductor itself, and also to provide a joint of sufficient mechanical strength, introduces the problem of testing the joint in a non-destructive manner. The testing apparatus should be portable, rugged, easily adaptable for testing a wide variety of joints, and give a reliable fast indication of both the mechanical and electrical condition of the joint. For example, a common problem faced by the manufacturers of industrial electrical equipment is to determine the mechanical electrical condition of butt-brazed joints of copper strap. The brazed joint may appear to be perfect, but it may contain a void or air space in the joint that will cause the joint to fail mechanically. Similarly, a mechanically sound brazed joint may contain so much brazing alloy between the ends of the copper strap that a relatively high resistance joint is formed that will cause a hot spot or overheating of the electrical apparatus, of which the joint is a part.

To prevent mechanically and/or electrically poor joints from getting into the electrical apparatus, it is essential that all joints be inspected. Mechanical tests are impractical because the test in most cases must be made at the manufacturing situs of the electrical apparatus, and mechanical testers are not usually of the portable type. Also, since mechanical tests can easily become destructive tests unless precisely controlled, most test equipment for testing joints is electrical in nature.

There are many different methods in use for electrically testing joints. One method involves passing a large direct current through the joint and adjacent connecting electrical conductors and placing an electrical contact or probe on one side of the joint and an electrical contact or probe on the other side of the joint and measuring the voltage drop on a very sensitive galvanometer. The probes are then removed and spaced the same distance apart on the adjacent connecting conductor and the deflection of the galvanometer compared with the deflection when the probes were bridging the joint. The disadvantages of this method are the fragility of the galvanometer, a cumbersome low voltage, high current unidirectional power supply, and the fact that two independent measurements must be made and then compared.

Another method is the Kelvin bridge method in which a set of probes or contacts are placed along the axis of the conductor, bridging the joint to be tested. A direct current is passed through the joint to be tested and also through a standard resistance element in the bridge, thus permitting the resistance of the joint to be read in ohms. This measurement is compared to the resistance of a similar length of the adjacent conductor. The disadvantages of this method are the lack of sensitivity for the very low resistances encountered and the extreme bulkiness of the bridge and direct current power supply.

The alternating potential eddy current methods available also possess disadvantages when applied to the testing of electrical joints. One eddy current method utilizes a probe having a diameter of approximately one-half inch. The probe is placed against the metal surface to be tested and a meter indicates the percent conductivity of the metal. The disadvantages of this method are the relatively large diameter of the probe and the necessity of having a smooth flat surface on which to place it. Joints in electrical apparatus, such as brazed joints, do not present a smooth surface, and in a large percent of the electrical apparatus, the width of the conductor or copper strap is smaller than the probe diameter.

Another eddy current method requires a conductor, including the joint to be tested, to be threaded through the axis of two identical coils that induce high frequency eddy currents into the portion of the conductor within the coils. The joint to be tested is placed within one of the coils and adjacent pure conductor is within the other coil, with the resistance of the joint thus being compared with a similar length of conductor. The disadvantage of this method is limited applicability due to the fact that the sensing coils must be permanently mounted. It is only applicable to testing joints where the conductor and joint can be placed through the sensing coils.

Ultrasonic testers which are used to detect hidden flaws, depend upon homogeneity of the material to be tested. A joint, such as a brazed joint, has both brazing alloy as well as the metal of the conductors joined, with no fixed relationship between the brazing alloy and the conductors in either amount or configuration. Therefore, the joint lacks the necessary homogeneity for ultrasonic testers to reliably test electrical joints.

Accordingly, it is an object of this invention to provide new and improved testing apparatus.

Another object of this invention is to provide new and improved testing apparatus for testing the mechanical and electrical condition of the joint between a plurality of electrical conductors.

A further object of this invention is to provide new and improved electrical testing apparatus which tests the mechanical and electrical conditions of the joint between a plurality of electrical conductors in a single operation and with a single indication.

Another object of this invention is to provide rugged, portable electrical testing apparatus which provides an alternating potential signal indicative of the mechanical and electrical condition of a joint between a plurality of electrical conductors.

Briefly, the present invention accomplishes the above cited objects by providing testing apparatus which passes an alternating current through the joint to be tested and a portion of the electrical conductors joined together to form the joint. Four contact members or probes are utilized, with the first and second probe bridging the joint to be tested and the third and fourth probe being placed on one of the conductors connected to the joint. The distance between the first and second probe, and the third and fourth probe is the same. The alternating potential drop between the first and second probe and hence across the joint to be tested, is compared with the alternating potential drop across the third and fourth probe. Hence the voltage drop across the joint is compared with the voltage drop across a like length of pure conductor. This is accomplished by connecting the first and second probe to a first input winding of a transformer and the third and fourth probe to a second and opposing input winding of the transformer. Thus, the voltage drop measured by the first and second probe and the voltage drop measured by the third and fourth probe are differentially compared, with any difference appearing at the secondary or output terminals of the transformer. The difference appearing at the output terminals of the transformer is amplified in conventional amplifier means to provide a signal with sufficient strength to operate a rugged portable instrument.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawing in which.

Figure 1:
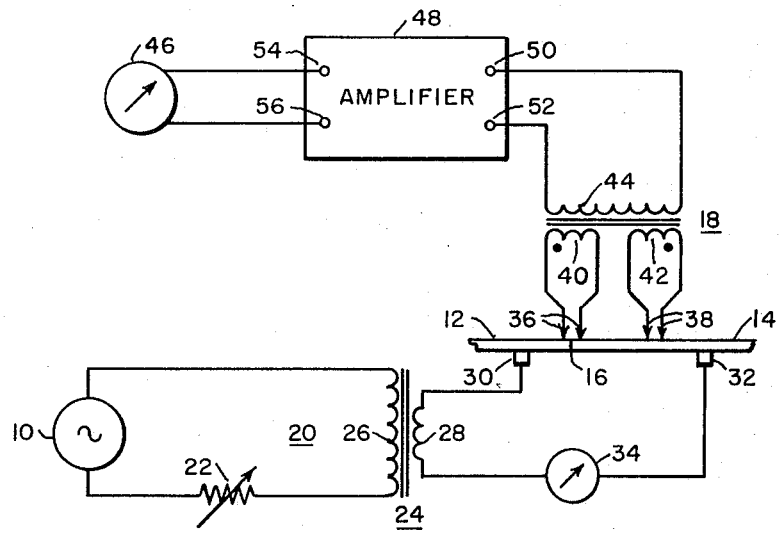
FIGURE 1 is a schematic diagram illustrating one embodiment of the invention.

Referring now to the drawings, and FIGURE 1 in particular, there is shown a schematic diagram illustrating an embodiment of the invention. In general, the circuit shown in FIG. 1 comprises a source of alternating potential 10 for application to the electrical conductors 12 and 14 which are joined to form joint 16, and transformer means 18 for providing a signal indicative of the electrical and mechanical condition of the joint 16. In particular, alternating source potential 10 may be adjusted to the desired magnitude by alternating potential adjusting means 20, which may comprise an adjustable resistor 22 and a transformer 24, as shown, an adjustable autotransformer, or any other potential adjusting means. Transformer 24 includes primary and secondary windings, 26 and 28 respectively, with primary winding 26 being connected in series circuit relation with adjustable resistor 22 and source of alternating potential 10. Secondary winding 28 is connected through contact members 30 and 32 to conductors 12 and 14 respectively, in a manner to include joint 16 between contact members 30 and 32 and also allow enough room for a potential drop to be measured across a length of conductor 12, or across a length of conductor 14.

In order to obtain the desired current flow through joint 16, as determined, in this instance, by the setting of adjustable resistor 22, an ammeter 34 may be connected in series circuit relation with secondary winding 28 of transformer 24 and contact members 30 and 32. Thus, by adjusting the setting on adjustable resistor 22 and observing the indication on ammeter 34, the desired current through joint 16 may be obtained, and this same magnitude of current may be easily maintained on all similar joints to be tested.

In order to obtain an indication of the voltage drop across joint 16 caused by the flow of alternating current through joint 16, a pair of contact members or probes 36 is disposed a predetermined distance apart to bridge joint 16. In order to obtain an indication of the voltage drop across a length of pure conductor equal in length to the portion of conductor 12 and 14 containing joint 16 which was bridged by the pair of probes 36, a pair of probes 38 is disposed the same distance apart as the pair of probes 36, on a section of pure conductor 14. A section of pure conductor 12 would, of course, be equally suitable, as long as both pair of probes 36 and 38, are between contact members 30 and 32. Since the same magnitude of current flows through the section of conductor 14 spanned by the pair of probes 38 as flows through the section of conductor including joint 16, and since the pair of probes 36 and 38 each span a like distance of conductor, any difference in the potential drop between the pair of probes 36 and the pair of probes 38 will be due entirely to the resistance of joint 16 being different from a like quantity of pure conductor.

In order to differentially compare the voltage drops between the pair of probes 36 and the pair of probes 38 and obtain an indication of any difference in one operation or set up, transformer means 18, having two input or primary windings 40 and 42 and an output or secondary winding 44, is utilized. Input windings 40 and 42 are wound or arranged in opposition to each other, such that the signal appearing at the secondary or output winding 44 is proportional to the difference between the signals applied to the input windings 40 and 42. Thus, by connecting the pair of probes 36 to input winding 40 and the pair of probes 38 to the input winding 42, a signal is produced at the output winding 44 whose magnitude is responsive to the difference in the resistance of the joint 16 from a like quantity of pure conductor. The greater the magnitude of the signal appearing at output winding 44, the greater the resistance of joint 16.

In order to obtain a signal proportional to the difference between the resistance of joint 16 and a like quantity of pure conductor that has sufficient magnitude to allow the use of a rugged, portable indicating means 46, amplifier means 48 may be used. Amplifier means which would be suitable are well known in the art and need not be described in detail herein. To keep the overall package light and portable, amplifying means 48 should preferably be of the semiconductor type.

In particular, the signal appearing at the secondary winding 44 of transformer means 18 is applied to amplifier means 48 at input terminals 50 and 52. The amplified signal appears at output terminals 54 and 56, and this signal is applied to indicating means or instrument 46. Thus, indicating means 46 produces a deflection proportional to the difference between the resistance of the joint 16 to be tested and a like quantity of pure conductor. The reading of indicating means 46 inherently shows the electrical condition of joint 16, since the test is electrical in nature. Also, as will be shown hereinafter, the reading of indicating means 46 is a good indication of the mechanical condition of joint 16. Where a large quantity of joints are to be tested and compared, indicating means 46 may also be a recording type of instrument.

The embodiment of the invention shown in FIGURE 1 may be constructed of small, lightweight, rugged components, and may be used anywhere there is a source of alternating potential. The indicating instruments 34 and 46 may be rugged and shock resisting, since the magnitudes of the signals to be indicated are such that a sensitive, fragile galvanometer is not required. The amplifier 48 may be of compact, rugged design utilizing semiconductors. Transformers 24 and 18 may be very small, because the power they are called upon to transform is minute.

In the operation of the circuit shown in FIGURE 1, the pair of probes 36 is disposed to contact conductor 12 and conductor 14 and thus bridge the joint 16, with the pair of probes 36 being a predetermined distance apart. The pair of probes 38 is disposed to contact conductor 12 or conductor 14 and bridge pure conductor, with the pair of probes 38 being the same distance apart as the pair of probes 36. Contact members 30 and 32 are then disposed to contact conductors 12 and 14 such that the pairs of probes 36 and 38 are between said contact members. The alternating potential source 10 is then connected to voltage adjusting means 20, with adjustable resistor 22 being set to provide the desired current flow through conductors 12 and 14 and joint 16, as indicated by ammeter 34. The difference between the resistance of the conducting material between pair of probes 36 and the resistance of the conducting material between pair of probes 38 appears immediately as a deflection on indicating means 46. Zero deflection on indicating means 46 would mean the joint 16 has the same resistance as the conducting material of which conductors 12 and 14 are constructed. The greater the deflection of indicating means 46, the higher the electrical resistance of the joint 16, thus showing directly the electrical condition of the joint 16. As will be shown graphically hereinafter, the indication produced by indicating means 46 is also an accurate representation of the mechanical strength of the joint.

Figure 2:
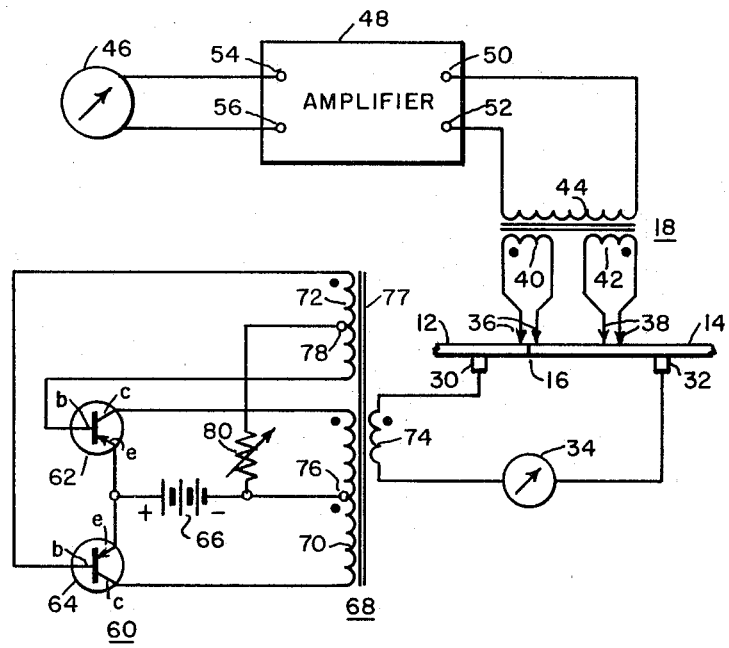
FIG. 2 is a schematic diagram illustrating another embodiment of the invention.

As hereinbefore stated, the only limitation imposed upon the embodiment of the invention illustrated in FIGURE 1 is the fact that a source of alternating potential 10 must be present. This is not a serious limitation when used by the manufacturer of electrical equipment in the manufacturing area, because of the ready availability of alternating potential in most manufacturing areas. However, if the tests are to be performed in the field, or other areas where a source of alternating potential is not readily available, the embodiment of the invention illustrated in FIG. 2 may be used. Like components in FIGURES 1 and 2 are indicated with like reference numerals, with the difference in the embodiments of the invention illustrated in FIGURES 1 and 2 being in the source of alternating potential. Instead of a source of alternating potential 10 being already available, the embodiment shown in FIG. 2 produces its own alternating potential in conventional inverter or oscillator means 60, utilizing small, rugged semiconductor components.

In particular, oscillator means 60 comprises a pair of three electrode semiconductor switching devices 62 and 64, which may be PNP junction type transistors, each having a base electrode *b*, emitter electrode *e* and collector electrode *c*, a source of unidirectional potential 66 which is to be inverted, and saturable magnetic core means 68.

The source of unidirectional potential 66 may be a battery, as illustrated, having positive and negative terminals as indicated by the plus and minus signs, or any other suitable source of unidirectional potential.

Saturable magnetic core means 68 includes a plurality of windings 70, 72 and 74, inductively disposed relative to magnetic core means 77. The material utilized in magnetic core 77 is preferably of a commonly available type having a rectangular hysteresis loop. Winding 70 of saturable magnetic core means 68 includes a tap connection 76, and winding 72 includes a tap connection 78.

The emitter electrodes *e* of transistors 62 and 64 are connected in common to the positive terminal of unidirectional source potential 66, with the negative terminal of unidirectional source potential 66 being connected to tap connection 76 of winding 70. The end connections of winding 70 are connected to the collector electrode *c* of transistors 62 and 64. Winding 72 of core means 68 is a feedback winding, with its end connections being connected to the base electrodes *b* of transistors 62 and 64. An adjustable resistor 80 is connected from tap connection 76 on winding 70 to tap connection 78 of winding 72. Winding 74 of core means 68 is connected in a manner similar to winding 28 shown in FIGURE 1.

In the operation of oscillator means 60, current will flow through the collector-emitter circuit of one of the transistors 62 or 64 before the other of said transistors, when the unidirectional source potential 66 is first connected. This is due to the fact that even similar transistors have slightly different characteristics. For purposes of explanation, we will assume that transistor 62 allows current to flow before transistor 64. Therefore, substantially the entire voltage of unidirectional source 66 is applied across the section of winding 70 above tap connection 76, causing current to flow from source 66, through the collector-emitter circuit of transistor 62, through the upper portion of winding 70, through terminal 76 and back to unidirectional source potential 66. The flow of current through the upper portion of winding 70, in the direction from the upper end of winding 70 to terminal 76 induces a voltage into feedback winding 72 having the polarity shown in FIG. 2. This feedback voltage applies a forward bias to transistor 62, maintaining transistor 62 in its conducting or saturated condition. The feedback voltage applies a reverse bias to transistor 64, maintaining transistor 64 in its non-conducting or cut-off condition. A voltage having the instantaneous polarity shown is also induced into winding 74.

As the magnetic flux in magnetic core 77 increases due to the current flow from unidirectional source potential 66 through the upper portion of winding 70, magnetic core 77 becomes saturated, with the result that there is substantially no further increase in the magnetic flux in magnetic core 77 and substantially zero voltages are induced in windings 78, 70 and 74, to thereby render both transistors 62 and 64 substantially non-conducting. When the magnetomotive force falls from a value sufficient to effect saturation of the core 77 to a zero value, the magnetic flux present in the magnetic core 77 is reduced by a small amount. This reduction in the magnetic flux is effective to induce voltages in windings 72 and 74 having polarities which are opposite to the polarities shown in FIG. 2, so that transistor 62 is maintained in its non-conducting condition, and transistor 64 is switched to its conducting condition. The voltage of unidirectional source potential 66 is now substantially across the lower portion of the winding 70 and current is allowed to flow from the positive terminal of source potential 66 through the collector-emitter circuit of transistor 64, through the lower portion of winding 70 in the direction from the lower end of winding 70 to the tap connection 76, and then back to source potential 66. This current flow through the lower portion of winding 70 produces a magnetomotive force which induces a voltage in feedback winding 72 that produces bias potentials for transistors 62 and 64 which maintain transistor 62 in its nonconducting condition and transistor 64 in its conducting condition. This magnetomotive force also induces a voltage into winding 74 of opposite polarity to the voltage induced in said winding when the current was flowing through the upper portion of winding 70. This condition continues until the core 77 again saturates, at which time, transistors 62 and 64 switch to the opposite mode of operation and the polarity of the voltage induced in winding 74 of core means 68 which is applied to a circuit which is similar to the circuit shown in FIGURE 1. In order to adjust the magnitude of the potential induced into winding 74, adjustable resistor 80 may be used.

The operation of the circuit shown in FIG. 2 is similar to the operation of the circuit shown in FIGURE 1, and hereinbefore described. The differences being the connection of the unidirectional source 66 into the circuit instead of alternating potential source 10, and the use of adjustable resistor 80 to obtain the desired current flow through joint 16, as measured by ammeter 34, instead of adjustable resistor 22.

It is to be understood that the embodiment of the invention shown in FIG. 2 may utilize other forms of oscillator means 60 than the design shown and described, with any means for converting a unidirectional potential to an alternating potential being suitable, as long as the portability of the equipment is maintained.

Figure 3:
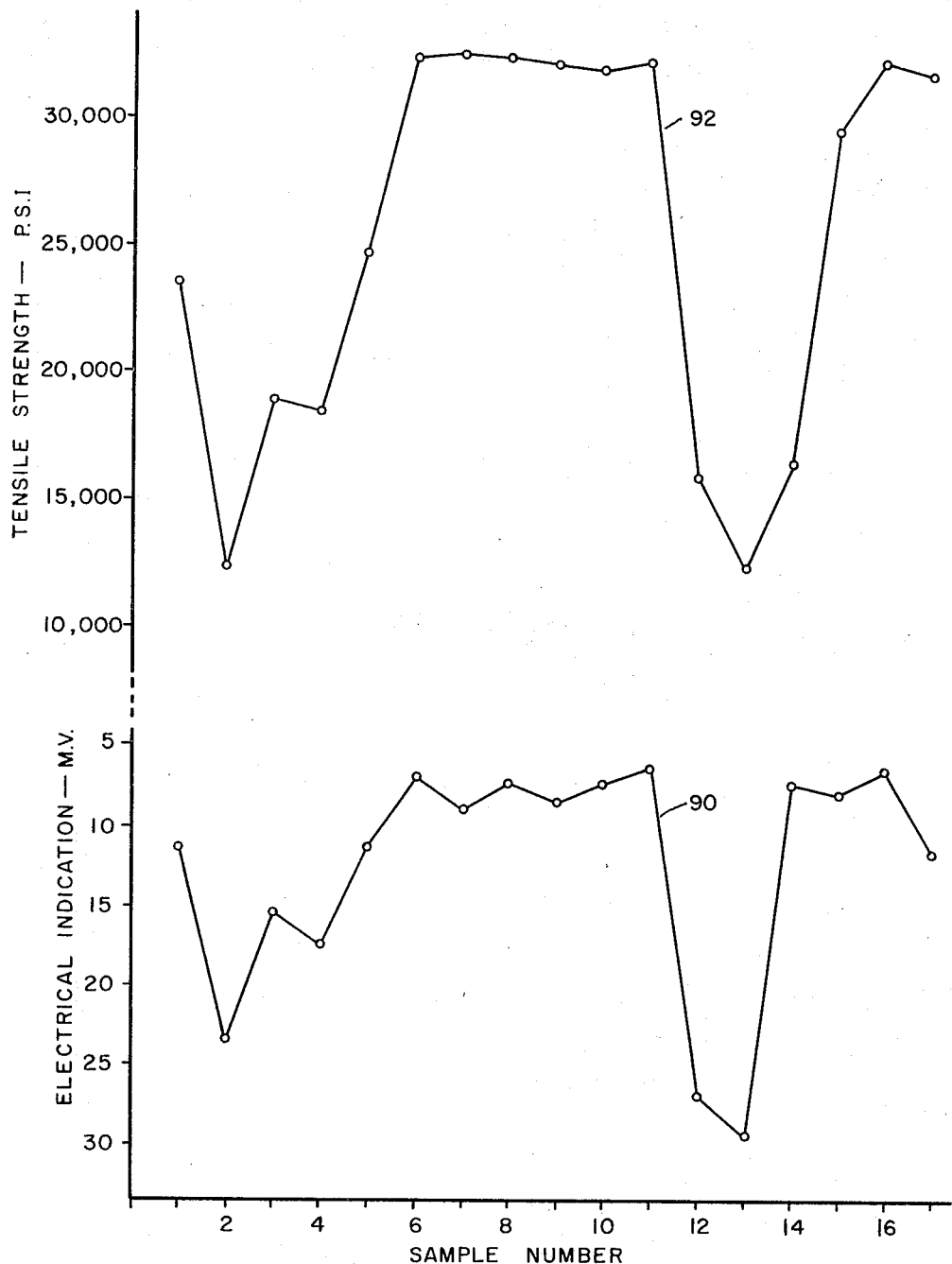
FIG. 3 is a graphic representation comparing the electrical indications obtained on a plurality of joints, by practicing the teachings of this invention, with the actual mechanical strength of the joint.

FIG. 3 is a graphic representation illustrating how the magnitude of the signal obtained by comparing the voltage drop across the joint to be tested with the voltage drop across a like length of pure conductor, indicates the mechanical condition of a joint, as well as the electrical condition. For this test, seventeen butt type joints were formed by brazing together similar sections of copper strap, with the brazing alloy, type and size of electrical conductor, and joint configuration, being of the type commonly used in the manufacture of electrical apparatus. Each sample was given a number and this number is plotted on the abscissa of the curve shown in FIG. 3, and the electrical indication obtained by utilizing the principles of this invention is plotted on the ordinate, with the curve 90 resulting. It will be noted that the greater the electrical reading, the closer to the abscissa the particular point on the curve 90 becomes. After the samples were tested on test apparatus constructed according to the teachings of this invention, each sample was mechanically tested to determine the tensile strength in pounds per square inch of each joint. The results of the mechanical test are also plotted on the ordinate, with the curve 92 resulting. It will be noted that there is a great similarity between the curve 90 obtained electrically according to the teachings of this invention, and curve 92 obtained mechanically. In fact, the curves are so similar, it can be seen that although the test apparatus disclosed herein is electrical and non-destructive in nature, that the mechanical condition of the joint may be accurately predicted without resorting to mechanical and possibly destructive tests.

Figure 4:
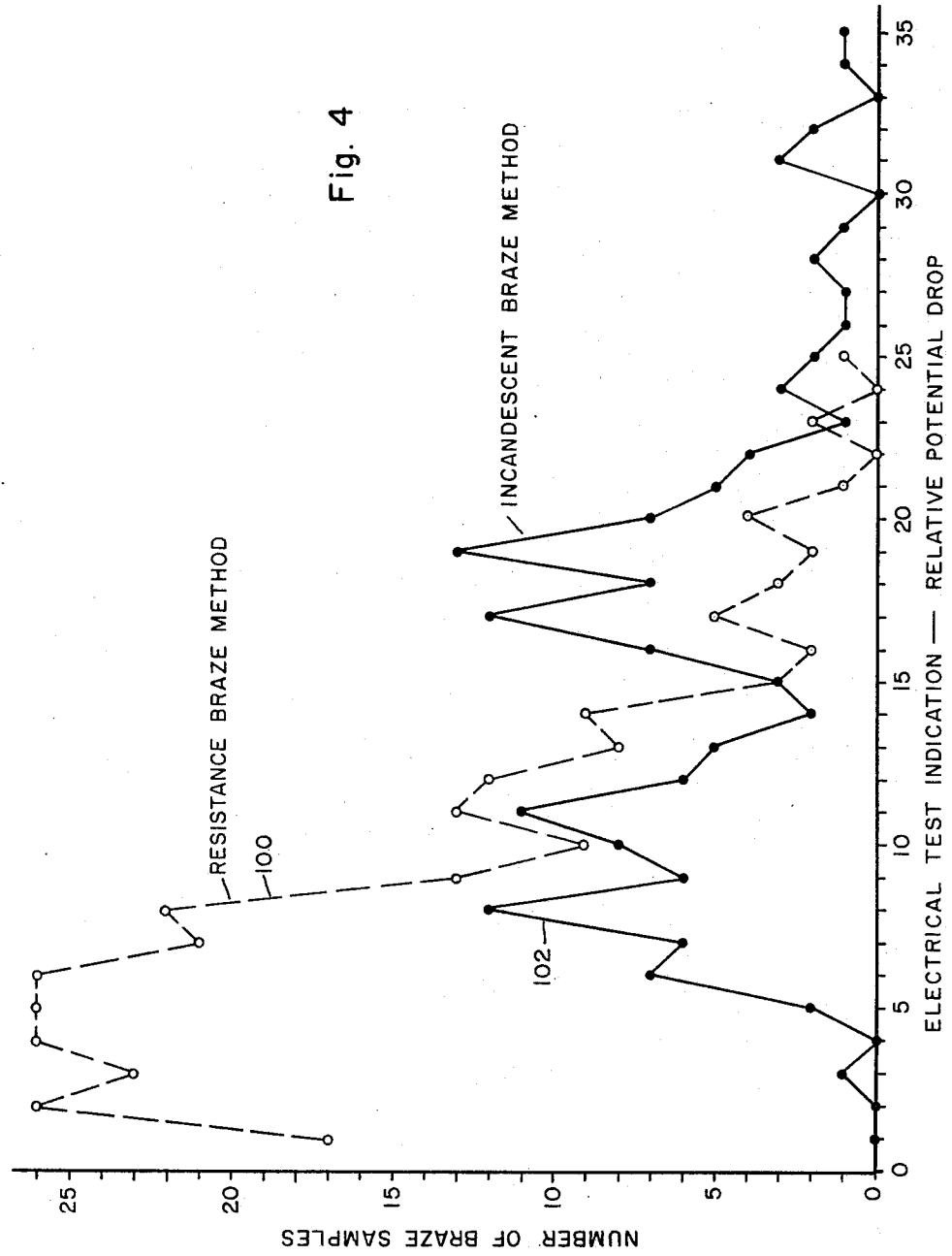
FIG. 4 is a graphic representation illustrating how the teachings of this invention may be utilized to determine the optimum joining method and joining material for a particular joint design.

The test apparatus proposed herein is not only an important manufacturing tool for testing the electrical and mechanical condition of joints produced in electrical apparatus as it is being manufactured, but it is an important laboratory and design tool. An example of the latter use is the testing and comparison of various brazing, soldering and welding alloys, and determining the effectiveness of the joints produced by such joining material. Another example is the testing and comparison of various joining methods, to determine which method produces the best electrical and mechanical joint, using a predetermined joint design, joining material, and type of conductors to be joined. FIGURE 4 is a graphic representation illustrating the effectiveness of two joining methods, i.e., resistance brazing and incandescent brazing. In each case, the same type of electrical conductors were joined and the same type of brazing alloy was utilized. The electrical test indication, as produced by utilizing the principles of the invention disclosed herein, is plotted along the abscissa and the number of samples having each respective test indication reading is plotted along the ordinate. Curve 100 was produced by samples brazed by the resistance method and curve 102 was produced by samples brazed by the incandescent method. It will be noted that most of the samples produced by the resistance method have readings or indications from zero to eight, while most of the samples produced by the incandescent method have readings or indications between 6 and 20. Since the higher the reading, the poorer the joint from an electrical and mechanical standpoint, it is evident for this particular design of joint, brazing alloy and conductors, the resistance braze method is superior.

The test apparatus disclosed herein has many advantages, among which are the portability of the equipment, the ruggedness of the components, and the ease in obtaining an indication of the electrical and mechanical condition of a joint with a simple set up and one reading on an indicating instrument. The condition of a joint appears in one quick reading, without the necessity of making two readings and then comparing them.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. Test apparatus for testing the condition of a joint formed between a pair of electrical conductors, comprising,
    a source of alternating potential,
    means for adjusting the magnitude of said source of alternating potential,
    said source of alternating potential being adapted for connection across the joint to be tested,
    first and second pair of contact members, the contact members of each of said first and second pair being spaced a predetermined distance apart, one of said pair of contact members being adapted for connection to one of the pair of electrical conductors, the remaining pair of contact members being adapted for connection across the joint between the pair of electrical conductors,
    a transformer having first and second input windings arranged in opposition, and an output winding,
    said first and second pair of contact members being connected to said first and second input windings, respectively,
    and indicating means connected to the output winding of said transformer,
    said output winding applying a signal to said indicating means responsive to the difference between the signals applied to said first and second input windings by said first and second pair of contact members.

2. The test apparatus of claim 1 wherein said source of alternating potential is provided by a source of unidirectional potential and an inverter.

References Cited by the Examiner
UNITED STATES PATENTS

| | | | |
|---|---|---|---|
| 2,094,234 | 9/1937 | Drain | 324—64 |
| 2,124,577 | 7/1938 | Kneer | 324—40 |
| 2,124,578 | 7/1938 | Kneer et al. | 324—64 |

WALTER L. CARLSON, *Primary Examiner.*

W. H. BUCKLER, E. E. KUBASIEWICZ,
*Assistant Examiners.*